3,322,750
3-SUBSTITUTED - 7 - (4' - FURAZANALKANOYL) AMINOCEPHALOSPORANIC ACIDS AND 3-SUBSTITUTED - 6 - (4' - FURAZANALKANOYL)AMINOPENICILLANIC ACIDS
Leonard Bruce Crast, Jr., North Syracuse, N.Y., assignor to Bristol-Myers Company, New York, N.Y., a corporation of Delaware
No Drawing. Filed Aug. 2, 1965, Ser. No. 476,685
10 Claims. (Cl. 260—239.1)

This application is a continuation-in-part of my prior copending application Ser. No. 427,110 filed Jan. 21, 1965, and now abandoned.

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria and especially Salmonella and, more particularly, relates to 7 - (4'-furazanalkanoyl)aminocephalosporanic acids and 6-(4'-furazanalkanoyl)aminopenicillanic acids bearing a hydroxy or a (lower)alkoxy substituent at the 3-position of the furazan, (i.e., 1,2,5-oxadiazine) ring and related salts and derivatives.

Antibacterial agents of the penicillin class have proven highly effective in the therapy of infections due to either Gram-positive or Gram-negative bacteria but few are effective against both, very few are effective in concentrations below 1.0 mcg./ml. and none are very effective in practical use against infections caused by Salmonella, e.g. *S. enteritidis*. It was the object of the present invention to provide novel compounds effective against both Gram-positive and Gram-negative bacteria including the resistant strains. It was a further object of the present invention to provide penicillins and cephalosporins active against Gram-positive and Gram-negative bacteria which are also efficiently absorbed upon oral administration to man and animals.

The objects of the present invention have been achieved by the provision, according to the present invention, of the acids of the formula

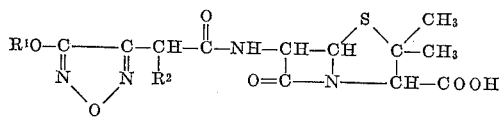

wherein $R^1$ and $R^2$ are each hydrogen or (lower)alkyl; and nontoxic, pharmaceutically acceptable salts thereof.

The objects of the present invention have also been achieved by the provision, according to the present invention, of the compounds of the formula (I)
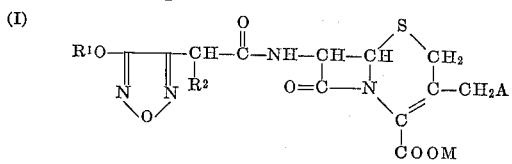

wherein $R^1$ and $R^2$ are each hydrogen or (lower)alkyl;

A is a hydrogen, hydroxyl, (lower)alkanoyloxy containing 2-8 carbon atoms, e.g. acetoxy, propionoyloxy, butanoyloxy, pentanoyloxy, etc., benzoyloxy, a quaternary ammonium radical, e.g. pyridinium, quinolinium, picolinium, lutidinium or, when taken together with M, a monovalent carbon-oxygen bond; and M is hydrogen, a pharmaceutically acceptable nontoxic cation, an anionic charge when A is a quaternary ammonium radical, or, when taken together with A, a monovalent carbon-oxygen bond.

For clarity, we have illustrated below the formulae of the compounds when, in Formula I, A is a quaternary ammonium radical (pyridinium) and M is an anionic charge and when A and M together are a monovalent carbon-oxygen bond.

(II)
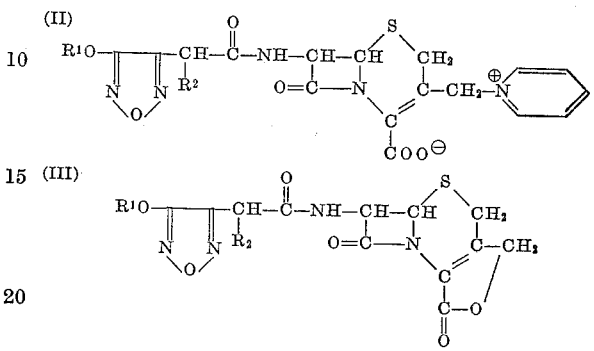

(III)

The preferred embodiments of the present invention are the free acids and salts thereof of which the free acids have the formulae

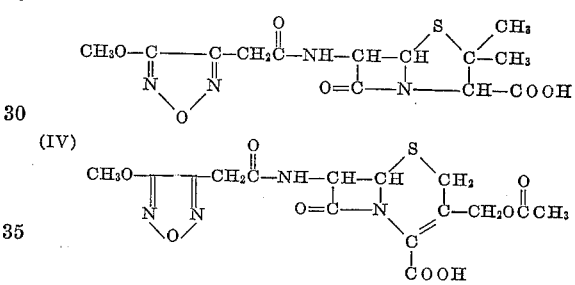

(IV)

and (V)
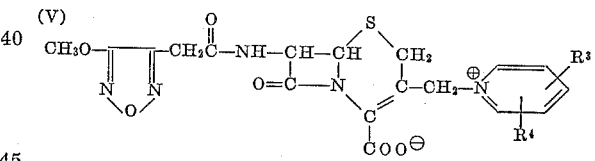

wherein $R^3$ and $R^4$ each represent hydrogen or methyl.

The pharmaceutically-acceptable, nontoxic cations include metallic cations such as sodium, potassium, calcium and aluminum and organic amine cations such as trialkylamines, e.g. triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N - (lower)alkylpiperidines, e.g. N-ethylpiperidine, and other amines which have been used to form salts with benzylpenicillin.

The products of the present invention are prepared by the reaction of 6-aminopenicillanic acid or a compound of the formula (VI)
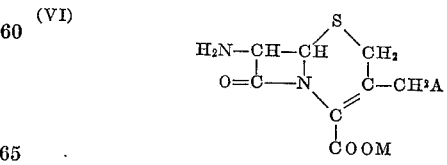

wherein A and M are described above (preferably in the form of a neutral salt such as the sodium salt or the triethylamine salt, i.e. when A is hydrogen, hydroxy, (lower)alkanoyloxy or benzoyloxy) with an active ester, e.g. 2,4-dinitrophenyl ester, p-nitrophenyl ester or N-hydroxysuccinimide ester, of an acid having the formula

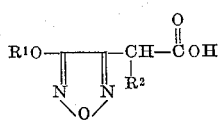

(in which R¹ and R² have the meaning set forth above) or with its functional equivalent as an acylating agent for a primary amino group. Such equivalents include the corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or active thioester (e.g. with thiophenol, thioacetic acid), may be used or the free acid itself may be coupled with 6-aminopenicillanic acid or the compound or Formula VI by the use of enzymes or of a carbodiimide reagent [cf. Sheehan and Hess, J. Amer. Chem. Soc. 77, 1067 (1955)]. Another equivalent of the 2,4-dinitrophenyl and p-nitrophenyl esters is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimdazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated, but this is not essential. The methods for carrying out these reactions to produce a penicillin or a cephalosporin and the methods used to isolate the penicillin or the cephalosporin so-produced are well-known in the art (cf. U.S. Patents Nos. 3,079,314, 3,117,126 and 3,129,224 and British Patents Nos. 932,644, 957,570 and 959,054.)

The compounds of Formula VI used in the present invention include 7-aminocephalosporanic acid and derivatives of 7-aminocephalosporanic acid. 7-aminocephalosporanic acid is prepared by hydrolysis of cephalosporin C and has the formula

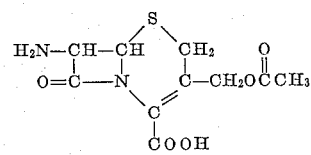

Acid hydrolysis of cephalospirin C to produce 7-aminocephalosporanic acid results in the coproduction of the lactone, 3-hydroxymethyl-7-aminodecephalosporanic acid lactone, formed by the further hydrolysis of the acetoxy group and subsequent internal esterification. The lactone has the formula

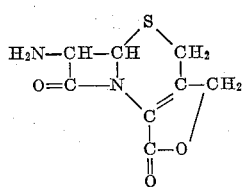

Enzymatic hydrolysis of the acetoxy group of 7-aminocephalosporanic acid results in the formation of 3-hydroxymethyl-7-aminodecephalosporanic acid having the formula

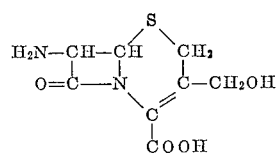

and such compound may be re-esterified with benzoic acid or a lower alkanoic acid, e.g. acetic acid, propionic acid and the like to form other esters. Preferably, re-esterification is carried out on a 3-hydroxymethyl-7-(4'-furazanalkanoyl)aminodecephalosporanic acid which is obtained by enzymatic hydrolysis of a 7-(4'-furazanalkanoyl)aminocephalosporanic acid.

Treatment of cephalosporin C with a tertiary amine, e.g. pyridine, lutidines, picolines and the like, followed by acid hydrolysis produces a nucleus which, in the case of pyridine, has the formula

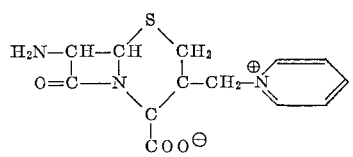

and has been given the name 3-pyridiniummethyl-7-aminodecephalosporanic acid inner salt.

The foregoing nuclei and the preparation thereof are known in the art and are described for example in U.S. Patent No. 3,117,126 and British Patents Nos. 932,644, 957,570 and 959,054.

3-methyl-7-aminodecephalosporanic acid having the formula

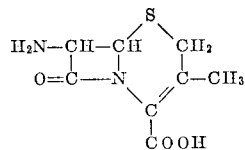

is produced by catalytic reduction of cephalosporin C followed by hydrolytic removal of the 5-aminoadipoyl side chain as described in U.S. Patent No. 3,129,224.

STARTING MATERIALS

The ring system having the structure

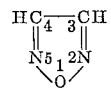

is named 1,2,5-oxadiazine or furazan with the atoms numbered as indicated.

The 3-hydroxy and 3-alkoxy-(e.g. 3-methoxy-) furazan-4-alkanoic acids (e.g. furazan-4-acetic acids) used in the present invention are prepared in the manner set forth in the examples below and in Berichte, 28, 762 (1895) for the preparation of 3-hydroxy-4-furazanacetic acid followed, if desired, by alkylation of the phenolic hydroxyl group (as with a diazoalkane such as diazomethane or a dialkyl sulfate such as dimethyl sulfate) followed by saponification of any ester formed, as by the usual treatment with alkali. The reagents used therein are prepared by the reaction of diethyl oxalate in the mixed ester condensation of Wislicenus (e.g. Berichte, 19, 3225) and of Claisen (Berichte, 20, 651) with an ethyl alkanoate such as ethyl acetate, ethyl propionate, ethyl n-butyrate etc. to produce the corresponding ethyl oxalylalkanoate; cf. Organic Reactions, volume I, chapter 9 and especially pages 292–293, John Wiley and Sons, Inc., New York, N.Y., 1942 and references cited therein, and see also A. Quilico and M. Freri, Gazz. Chim. Ital. 76, 3–29 (1946).

The compounds of the present invention may be viewed, broadly speaking, as the result of combining the single, naturally occurring optical isomer, 6-aminopenicillanic acid, with an acid which contains (when $R^2$ is alkyl but not hydrogen) an asymmetric carbon atom as indicated by the asterisk, thus:

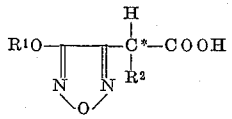

Thus the penicillin produced when a racemic acid is used will be a mixture of two diastereoisomers. Both are biologically active and both of these isomers and mixtures thereof are included within the scope of the present invention. The individual isomers are prepared in pure form by starting with the pure dextro or levo form of the acid or by physical separation of the mixture produced from the racemic acid.

The following examples will serve to illustrate this invention without limiting it thereto. All melting points are uncorrected and all temperatures are given in degrees centigrade.

Example 1

(A) *3-hydroxy-4-furazanacetic acid.*—To a solution of 100 g. of hydroxylamine hydrochloride in 250 ml. of water was added 100 g. diethyl oxalacetate sodium with stirring. Sodium carbonate was then added in portions until the pH was 8–8.5. (Excess $Na_2CO_3$ is present). The slurry was stirred for three hours and then heated to reflux for one hour. After standing for 15 hours the slurry was acidified with 50% $H_2SO_4$ until strongly acidic (excess is used). After stirring three hours at room temperature the red solution was extracted with three 500 ml. portions of ether and combined, evaporated to an oil, and dissolved in 250 ml. of water. To this aqueous solution was added a solution of 30 g. N,N′-dibenzylethylenediamine diacetate in 300 ml. of water. The N,N′-dibenzylethylenediamine salt crystallized immediately and after brief cooling and filtration was recrystallized from methanol to give 28 g. of air-dried material; M.P. 163° C. with decomposition (NMR consistent with structure).

The free acid was obtained by shaking the N,N′-dibenzylethylenediamine salt in 200 ml. of 10% $H_3PO_4$ and 200 ml. of ether until all had dissolved. The ether phase was separated and two more 200 ml. ether extracts combined with the first. These extracts were dried over anhydrous sodium sulfate, filtered and evaporated to dryness to give 14 g. of 3-hydroxy-4-furazanacetic acid; M.P. 157–158° C. (Literature M.P. 158° C.) A sample recrystallized from acetone-benzene had a melting point of 163–164° C.

(B) *Potassium 6-[α-(3-hydroxy-4-furazan)acetamido]penicillanate.*—To a stirred and cooled solution of 4.32 g. (0.03 mole) of 3-hydroxy-4-furazanacetic acid and 3.03 g. (0.03 mole) of 2,6-lutidine in 50 ml. of THF (tetrahydrofuran) was added dropwise 4.08 g. (0.03 mole) of ethyl chloroformate over a five-minute period at −10° C. Ten minutes later a solution of 6.48 g. (0.03 mole) of 6-aminopenicillanic acid and 6 g. of 2,6-lutidine in 25 ml. of water was added all at once to the vigorously-stirred slurry. The temperature rose to +5° C. and when the temperature began to fall again the ice-salt-acetone bath was removed and stirring continued for one hour. The resulting solution was diluted with 200 ml. of water, extracted once with 300 ml. of ether, the ether extract discarded and the aqueous phase cooled and stirred under a layer of 100 ml. of MIBK (methyl isobutyl ketone) while 50% $H_3PO_4$ was slowly added to pH 2. The MIBK extract was washed three times with water, dried briefly over $Na_2SO_4$, filtered, and treated with 15 ml. of 50% KEH (potassium 2-ethylhexanoate in n-butanol). The oil which separated was triturated with n-butanol until solid, filtered and dried in vacuo over $P_2O_5$. The yield was 4 g. potassium 6 - [α - (3-hydroxy-4-furazan)acetamido]penicillanate, decomposing above 100° C. IR and NMR showed it to be a crude sample of the desired product.

Example 2

(A) *3-methoxy-4-furazanacetic acid.*—To a stirred solution of 12.8 g. (0.1 mole) of 3-hydroxy-4-furazanacetic acid in 500 ml. of ether was added an ethereal solution of diazomethane in portions at 0° C. until the yellow color of diazomethane persisted and no more nitrogen was observed being evolved. After stirring an additional one hour at room temperature a few drops of glacial acetic acid were added to destroy excess $CH_2N_2$. The ether was then removed under reduced pressure and the residual oil slurried in 100 ml. of 10% NaOH at room temperature until a clear solution was obtained (ca. one hour). The solution was filtered, cooled and acidified to pH 2 with concentrated hydrochloric acid. Gas evolution was noticed. The solution was saturated with salt and extracted with three 100 ml. portions of ether. The combined extracts were dried over $Na_2SO_4$, filtered and evaporated to an oil. Upon trituration with "Skellysolve B" (petroleum ether, B.P. 40–60° C.) there was obtained 9.2 g. of crystalline 3-methoxy-4-furazanacetic acid which melted at 56–59° C. Two grams were dissolved in 25 ml. of n-butanol and 7 ml. of 50% KEH added; upon scratching and cooling there was obtained 1.5 g. of potassium salt.

*Analysis.*—Calc'd for $C_5H_5N_2O_4K$: C, 30.61; H, 2.57; N, 14.28. Found: C, 30.18; H, 2.73; N, 13.99.

(B) *Potassium 6-[α-(3-methoxy-4-furazan)acetamido]penicillante.*—To a stirred and cooled slurry of 5.4 g. (0.025 mole) of 6-aminopenicillanic acid, 8.4 g. (0.1 mole) of sodium bicarbonate, 35 ml. of acetone and 75 ml. of water at 5° C. was added, all at once, a solution of 3-methoxy-4-furazanacetyl chloride in 40 ml. of acetone which had previously been prepared by gently refluxing 4 g. (0.025 mole) of 3-methoxy-4-furazanacetic acid in 10 ml. of thionyl chloride for 30 minutes, removing the excess $SOCl_2$ under reduced pressure, and dissolving the residual oil in the acetone.

After stirring 30 minutes at 5–10° C. the ice bath was removed and stirring continued for another hour. The resulting solution was diluted with 100 ml. of water, extracted once with 300 ml. ether and the aqueous layer cooled and acidified to pH 2 under a layer of 150 ml. of ethyl acetate. The ethyl acetate extract was washed three times with water and then dried briefly over sodium sulfate. The filtered solution was treated with 12 ml. of 50% KEH and scratched and cooled. There was obtained 7 g. of crystalline potassium 6-[α-(3-methoxy-4 - furazan)acetamido]penicillanate which decomposed at 221–222° C. (vacuum dried over $P_2O_5$).

*Analysis.*—Calc'd for $C_{13}H_{15}N_4O_6S \cdot K$: C, 39.51; H, 3.83; N, 14.21. Found: C, 39.69; H, 4.24; N, 13.69.

This compound in vitro exhibited Minimum Inhibitory Concentrations of 0.031–0.062 mcg./ml. vs. *Staphylococcus aureus* Smith and of 0.8–1.0 mcg./ml. vs. *Salmonella enteritidis* and in mice versus *S. enteritidis* exhibited $CD_{50}$'s of about 5.4 mgm./kg. upon intramuscular injection and about 16 mgm./kg. upon oral administration. This compound was also effective orally in curing infections in mice caused by *S. aureus* Smith, *Kl. pneumoniae* and *Proteus* No. 329, respectively.

Example 3

Substitution in the procedure of Examples 1 and 2 for the diethyl oxalylacetate sodium used therein of an equimolar weight of diethyl oxalylpropionate sodium and diethyl oxalyl-n-butyrate sodium, respectively, produces potassium 6 - [α-(3-methoxy-4-furazan)propionamidopenicillanate, and potassium 6-[α-(3-methoxy-4-furazan)butyramido]penicillanate, respectively.

Example 4

7-[α-(3-methoxy-4-furazan)acetamido]cephalosporanic acid and sodium salt.—A mixture of 7.9 g. (0.05 mole) of 3-methoxy-4-furazanacetic acid and 25 ml. of thionyl chloride were heated on the steam bath for forty-five minutes and the excess SOCl₂ was then removed under reduced pressure to leave 3-methoxy-4-furazanacetyl chloride as an oil which was used as is for the acylation of 7-aminocephalosporanic acid (7-ACA).

The crude acid chloride was then dissolved in 65 ml. of acetone and added all at once to a rapidly-stirred and ice-cold (3°–5° C.) solution of 13.6 g. (0.05 mole) of 7-ACA, 13 g. of NaHCO₃, 65 ml. of acetone, and 125 ml. of water. After 10 minutes the ice bath was removed and stirring was continued for one hour. The resulting solution was diluted with 150 ml. of water and extracted with 400 ml. of ether. The aqueous phase was separated and the ether phase extracted with a 100 ml. portion of water and combined with the first aqueous layer. The combined extracts were then layered with 300 ml. of ether and, with cooling and stirring, acidified to pH 2 with 40% H₃PO₄. The ether extract was separated and combined with a second extract of 100 ml. of methyl isobutyl ketone (MIBK) and then washed three times with 200 ml. portions of water. The ether-MIBK solution was then dried briefly over anhydrous MgSO₄ and filtered. The MgSO₄ filter cake was washed with three 25 ml. portions of ether and two 25 ml. portions of MIBK and combined with the filtrate. Petroleum ether ("Skellysolve B") was then added until the cloud point was reached. Scratching the flask induced crystallization and after one hour there was obtained 6.8 g. (dec. pt. 126° C.) of ether washed and vacuum dried (over P₂O₅) 7-[α-(3-methoxy-4-furazan)-acetamido]cephalosporanic acid (32.8). A total of 1.8 g. of the free acid was dissolved in 250 ml. of ethyl acetate and treated with 2 ml. of 50% NaEH (sodium 2-ethylhexanoate in n-butanol) to give 1.8 g. of crystalline sodium salt (dec. pt. 175° C.). The infrared and NMR curves were entirely consistent with the expected structure.

*Analysis.*—Calc'd. for C₁₅H₁₅N₄O₈S·Na: C, 41.47%; H, 3.49%; N, 12.90%; found: C, 40.84%; H, 3.37%; N, 12.68%. (Corrected for 3.95% water found by Karl Fischer.) Calc'd. for C₁₅H₁₆N₄O₈S: C, 43.51%; H, 3.90%; N, 13.53%; found: C, 43.93%; H, 4.30%; N, 13.24%.

This product as either the acid or the sodium salt was found to inhibit *Staphylococcus aureus* Smith at about 0.31 mcg./ml., to inhibit the benzyl-penicillin resistant *Staphyococcus aureus* Bx 1633–2 at about 0.8 mcg./ml., to inhibit *Salmonella enteritidis* at about 1.6 mcg./ml., to be not serum bound, to exhibit vs. *Staph. aureus* Smith in mice CD₅₀'s of about 2.5 mgm./kg. upon intramuscular administration and about 5.2 mgm./kg. upon oral administration and to have an acute toxicity greater than 100 mgm./kg.

Example 5

A mixture of 722 mgm. (0.005 mole) of 3-methoxy-4-furazanacetic acid and 5 ml. thionyl chloride is heated on the steam bath for 20 minutes and the excess SOCl₂ removed under reduced pressure at 25° C. Two portions (25 ml.) of petroleum ether are added and each is removed in vacuo to remove the last traces of SOCl₂. The residual, oily 3-methoxy-4-furazan-acetyl chloride is dissolved in 25 ml. methylene chloride and added dropwise at 0° C. with stirring to a previously prepared solution of 1.36 g. (0.005 mole) of 7-aminocephalosporanic acid, 1.4 ml. (0.010 mole) triethylamine and 25 ml. CH₂Cl₂ which is obtained by stirring at 22° C. for 30 minutes and then filtering. After the addition the resulting solution is stirred ten minutes in the ice-salt bath and then for an hour with the bath removed. The CH₂Cl₂ solution is then extracted with three 25 ml. portions of water and two 25 ml. portions of 5% aqueous NaHCO₃. The combined aqueous extracts are layered with 50 ml. ethyl acetate, cooled and stirred in an ice-bath while 40% H₃PO₄ is added until pH 2 is reached. The ethyl acetate extract is combined with a second 25 ml. ethyl acetate extract and washed three times with 25 ml. portions of water. The ethyl acetate solution containing the 7-[α-(3-methoxy-4-furazan)-acetamido]cephalosporanic acid is then dried 10 minutes over anhydrous MgSO₄ in an ice bath, filtered and treated with 2.5 ml. of a 50% solution in n-butanol of sodium 2-ethylhexanoate. The product crystallizes immediately and is cooled for 10 minutes in an ice bath, collected by filtration, washed with three 10 ml. portions of acetone and three 10 ml. portions of petroleum ether (B.P. 40°–60° C.) and dried for 30 minutes at 1 mm. Hg over P₂O₅. The yield is about one gram of crystalline sodium 7-[α-(3-methoxy-4-furazan)-acetamido]-cephalosporanate having NMR and IR spectra consistent with the desired structure and indicative of a high state of purity.

Example 6

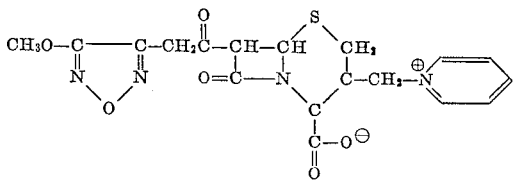

3-pyridiniumethyl-7-aminodecephalosporanic acid inner salt (1.5 g.) is shaken with methylene chloride at room temperature until the mixture becomes homogeneous and this solution is used in place of the 7-aminocephalosporanic acid solution in the procedure of Example 5 to prepare 3-pyridiniummethyl-7-[α-(3-methoxy-4-furazan)-acetamido]decephalosporanic acid inner salt. This product is sensitive to light so that it is advisable to protect it from light as much as practical during its manufacture and subsequent processing and packaging.

Example 7

3-methoxy-4-furazan-acetic acid (0.002 mole) and 2,4-dinitrophenol (0.002 mole) are dissolved in dry dioxane (10 ml.) and the solution is cooled in an ice bath. N,N'-dicyclohexylcarbodiimide (0.002 mole) is added and the solution is shaken well and left at room temperature for 45 minutes. The precipitated urea is removed by filtration and washed with ethyl acetate (25 ml.). The filtrate and washings are combined and concentrated in vacuo at room temperature to leave as the residue the desired 2,4-dinitrophenyl 3-methoxy-4-furazan-acetate.

3-pyridiniummethyl-7-aminodecephalosporanic acid inner salt (0.002 mole) is shaken with methylene chloride at room temperature until the mixture is homogeneous. The mixture is cooled in an ice bath and 2,4-dinitrophenyl 3-methoxy-4-furazan-acetate (0.002 mole) is added with shaking and the resulting solution left at room temperature until completion of the reaction. The reaction is followed by measuring the intensity of the amide absorption band at 1675 cm.⁻¹ in the infrared spectrum. The mixture is filtered and addition of ether precipitates the product, 3-pyridiniummethyl-7-[α-(3-methoxy-4-furazan)acetamido]decephalosporanic acid inner salt. The product is dissolved in methylene chloride, reprecipitated with ether, collected, dried and found to contain the β-lactam structure as shown by infrared analysis, to inhibit *Staph. aureus* at low concentrations and to be highly soluble in water.

Example 8

Pyridine (10 ml.) is added with stirring to a mixture of water (50 ml.) and 7-[α-(3-methoxy-4-furazan)acetamido]cephalosporanic acid (5 g.) to form a solution which is left under nitrogen at about 45° C. for twelve hours and then extracted four times with 30 ml. methylene chloride. The aqueous phase is concentrated in vacuo at about 30° C. and then passed through a column containing a strongly basic, anion exchange resin of the quaternary ammonium type (e.g. "Dowex 1") in the acetate cycle. The eluates containing the desired pyridine derivative as judged polarimetrically are combined, lyophilized and triturated in methanol to give solid 3-pyridiniummethyl-7-[α-(3 - methoxy - 4 - furazan)acetamido]decephalosporanic acid inner salt. By concentrating the methanol triturate at 30° C. in vacuo and then pouring the concentrate so obtained into a large volume of acetone there is precipitated an additional amount of this product.

*Example 9*

Substitution of an equal volume of α-picoline, γ-picoline and 2,4-lutidine, respectively, for pyridine in the procedure of Example 8 produces 3-α-picoliniummethyl-7-[α-(3-methoxy-4-furazan)acetamido]decephalosporanic acid inner salt,
3-γ-picoliniummethyl-7-[α-(3-methoxy-4-furazan)acetamido]decephalosporanic acid inner salt, and
3-2',4'-lutidiniummethyl-7-[α-(3-methoxy-4-furazan)acetamido]decephalosporanic acid inner salt, respectively.

*Example 10*

Substitution of an equimolar amount of 3-γ-picoliniummethyl-7-aminodecephalosporanic acid inner for the 3-pyridinium-7-aminodecephalosporanic acid inner salt in the procedure of Example 7 produces 3-γ-picoliniummethyl-7-[α-(3-methoxy-4 - furazan)acetamido]decephalosporanic said inner salt.

*Example 11*

The product of Example 5 is dissolved in water and treated with acetylesterase obtained from orange peels according to the procedure of Jansen et al., Arch. Biochem., 15, 415 (1947) at pH 6 for 15 hours. The resulting solution is passed through a column containing a weak, anionic ion exchange resin (e.g. "Amberlite IR 4B") in the acetate form and the column is then eluted with aqueous acetic acid which has been adjusted to pH 5.5 with pyridine. The eluate is adjusted to pH 8 by the addition of sodium hydroxide and is then evaporated in vacuo to give 3-hydroxymethyl-7-[α-(3-methoxy - 4 - furazan)acetamido]decephalosporanic acid in the form of its sodium salt.

*Example 12*

When in Example 5 the 7-aminocephalosporanic acid is replaced by an equimolar amount of 3-methyl-7-aminodecephalosporanic acid there is obtained the sodium salt of 3-methyl-7-[α-(3 - methoxy - 4 - furazan)acetamido]decephalosporanic acid.

*Example 13*

3-hydroxymethyl-7-aminodecephalosporanic acid lactone (0.002 mole) is shaken with methylene chloride at room temperature until the mixture is homogeneous. The mixture is cooled in an ice bath and 2,4-dinitrophenyl-3-methoxy-4-furazan-acetate (0.002 mole) is added with shaking and the resulting solution is held at room temperature until completion of the reaction as followed by measurement of the intensity of the amide absorption band at 1675 cm.$^{-1}$ in the infrared spectrum. After filtration, the addition of ether to the filtrate precipitates 3-hydroxy-methyl-7-[α-(3-methoxy-4-furazan)acetamido]decephalosporanic acid lactone. The product is dissolved in methylene chloride, reprecipitated by adding ether, collected by filtration and dried.

*Example 14*

7-aminocephalosporanic acid (0.001 mole) and triethylamine (0.004 mole) are shaken in methylene chloride (2 ml.) until the mixture is homogeneous. This mixture is cooled in an ice bath and 2,4-dinitrophenyl 3-methoxy-4-furazan-acetate (0.001 mole) dissolved in 3 ml. methylene chloride is added with shaking; the resulting solution is allowed to stand at room temperature for two hours to complete the reaction. The progress of the reaction is followed by measuring the intensity of the amide absorption band at 1675 cm.$^{-1}$ in the infrared spectrum. The addition of dry ether precipitates the triethylamine salt of 7-[α-(3-methoxy - 4 - furazan)acetamido]cephalosporanic acid.

*Example 15*

7-aminocephalosporanic acid (10 g., finely divided) in suspended in boiling ethyl acetate (400 ml.) and 3-methoxy-4-furazan-acetyl chloride (10 g.) in ethyl acetate (40 ml.) is added. The mixture is boiled under reflux for one hour, cooled and filtered. Aniline (10 ml.) is added and after one hour the mixture is extracted four times with 200 ml. portions of 3% aqueous NaHCO$_3$ and the combined alkaline, aqueous extracts are extracted three times with ethyl acetate (200 ml. portions), discarding the ethyl acetate extract. The aqueous solution is acidified to pH 1.2 and the product, 7-[α-(3-methoxy-4-furazan)acetamido]cephalosporanic acid, is twice extracted into ethyl acetate (300 ml.) portions. The combined ethyl acetate extracts are washed with water (4× 100 ml.), dried over anhydrous MgSO$_4$, filtered to remove the drying agent and concentrated in vacuo at room temperature to precipitate the product, which is recrystallized, if desired, from aqueous acetone or ethanol.

*Example 16*

Substitution in the procedure of Example 4 for the 3-methoxy-4-furazanacetic acid used therein of an equimolar weight of α-(3-methoxy-4-furazan)propionic acid and of α-(3-methoxy-4-furazan)-n-butyric acid, respectively produces 7-[α-(3-methoxy-4-furazan)-propionamido]cephalosporanic acid, and
7-[α-(3-methoxy-4-furazan)-n-butyramido]cephalosporanic acid, respectively.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. A compound selected from the group consisting of an acid of the formula

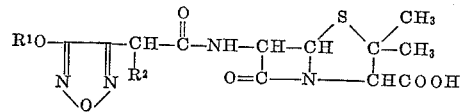

wherein R$^1$ and R$^2$ are each a member selected from the group consisting of hydrogen and (lower)alkyl; and nontoxic, pharmaceutically acceptable salts thereof.

2. The compound of the formula

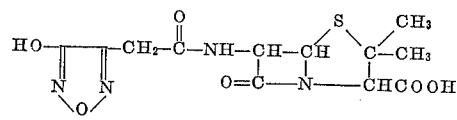

and nontoxic, pharmaceutically acceptable salts thereof.

3. A compound of the formula

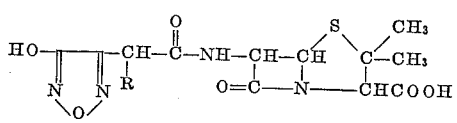

wherein R represents (lower)alkyl; and nontoxic, pharmaceutically acceptable salts thereof.

4. The compound of the formula

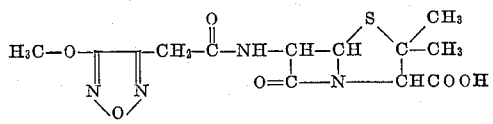

and nontoxic, pharmaceutically acceptable salts thereof.

5. A compound of the formula

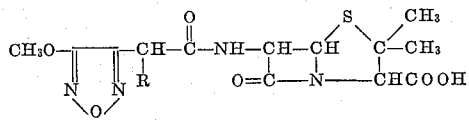

wherein R represents (lower)alkyl; and nontoxic, pharmaceutically acceptable salts thereof.

6. A compound having the formula

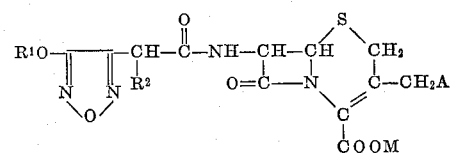

wherein
R$^1$ and R$^2$ are each hydrogen or (lower)alkyl;
A is hydrogen, hydroxyl, (lower)alkanoyloxy, benzoyloxy, a quaternary ammonium radical of the formula

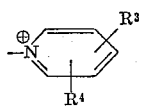

wherein R$^3$ and R$^4$ are each hydrogen or methyl or, when taken together with M, a monovalent carbon-oxygen bond; and M is a hydrogen, a pharmaceutically acceptable nontoxic cation, an anionic charge when A is a quaternary ammonium radical or, when taken together with A, a monovalent carbon-oxygen bond.

7. A compound having the formula

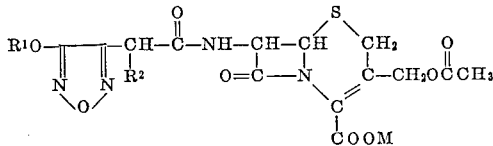

wherein R$^1$ and R$^2$ are each hydrogen or (lower)alkyl and M is a pharmaceutically acceptable, nontoxic cation.

8. A compound having the formula

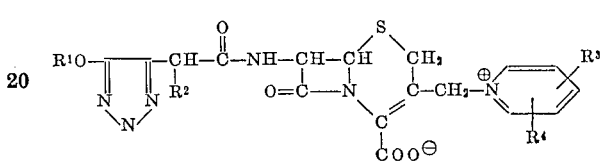

where R$^1$, R$^2$, R3 and R$^4$ each represent hydrogen or methyl.

9. 7-α-(3-methoxy 4-furazan)acetamido)acetamido]-sporanic acid.

10. Sodium 7-[α-(3 - methoxy-4-furazan)acetamido]-cephalosporanate.

References Cited

UNITED STATES PATENTS 2,996,501  8/1961  Doyle et al. _____ 260—239.1

NICHOLAS S. RIZZO, *Primary Examiner.*

UNITED STATES PATENT OFFICE
CERTIFICATE OF CORRECTION

Patent No. 3,322,750                                        May 30, 1967

Leonard Bruce Crast, Jr.

It is hereby certified that error appears in the above numbered patent requiring correction and that the said Letters Patent should read as corrected below.

Column 1, line 62, for "A is a hydrogen" read -- A is hydrogen --; column 2, lines 50 to 65, the formula should appear as shown below instead of as in the patent:

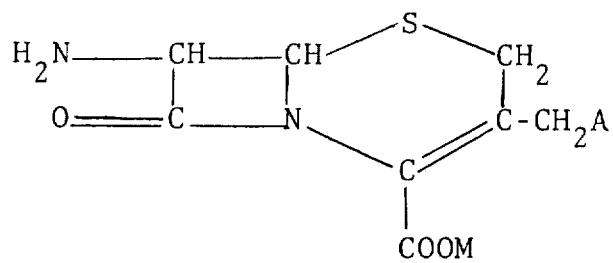

column 5, line 72, for "50%" read -- 40% --; column 6, line 35, for "6-[α-(3-methoxy-4-furazan)acetamido]-penicillante" read -- 6-[α-(3-methoxy-4-furazan)acetamido]-penicillanate --; column 7, line 11, for "7-aminocphalosporanic" read -- 7-aminocephalosporanic --; line 38, for "(32.8)" read -- (32.8%) --; column 9, line 28, after "inner" insert -- salt --; line 32, for "said" read -- acid --; column 10, line 10, for "in" read -- is --; column 12, line 1, for "M is a hydrogen," read -- M is hydrogen, --; line 25, for "R 3" read -- $R^3$ --; lines 27 and 28, for "7-α-(3-methoxy 4-furazan)acetamido)acetamido]-sporanic acid." read -- 7-[α-(3-methoxy-4-furazan)acetamido]cephalosporanic acid. --; column 12, line 31, for "References Cited" read -- References Cited by Applicant --; line 33, strike out "2,996,501 8/1961 Doyle et al---260-239.1' and insert instead the following:

2,941,995       6/1960        Doyle et al.
        2,951,839       9/1960        Doyle et al.
        2,985,648       5/1961        Doyle et al.
        2,996,501       8/1961        Doyle et al.
        3,174,964       3/1965        Hobbs et al.

3,322,750

FOREIGN PATENTS

| | | |
|---|---|---|
| 889,066 | 2/1962 | Great Britain. |
| 905,778 | 9/1962 | Great Britain. |
| 948,076 | 1/1964 | Great Britain. |
| 957,570 | 5/1964 | Great Britain. |
| 982,252 | 2/1965 | Great Britain. |

Signed and sealed this 20th day of August 1968.

(SEAL)
Attest:

EDWARD M. FLETCHER, JR.
Attesting Officer

EDWARD J. BRENNER
Commissioner of Patents